Figure 1:
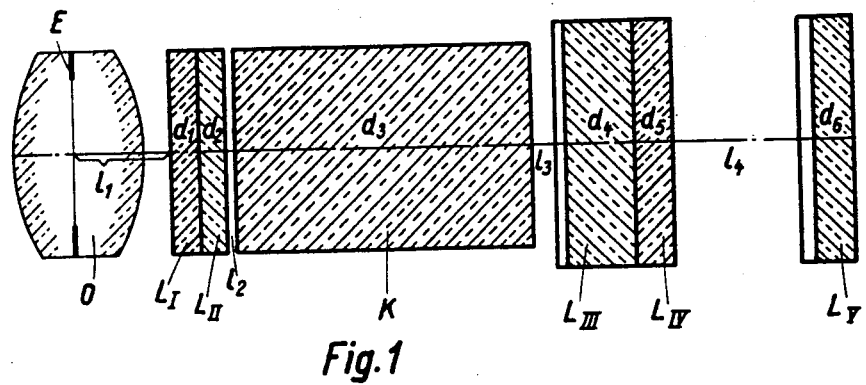

United States Patent Office 2,950,651
Patented Aug. 30, 1960

2,950,651

ANAMORPHOTIC SUPPLEMENTARY LENS SYSTEM

Horst Köhler, Heidenheim (Brenz), and Helmut Knutti, Oberkochen, Germany, assignors to Carl Zeiss, Heidenheim (Brenz), Wurttemberg, Germany Filed Apr. 18, 1957, Ser. No. 653,710

Claims priority, application Germany May 11, 1956

3 Claims. (Cl. 88—57)

The present invention concerns an afocal anamorphotic supplementary lens system constructed after the manner of a Galilean telescope, i.e. a system which is arranged in the imaging ray path of a photographic objective on the side of the longer conjugate and which serves for the attainment of an image sharp in all image points in the image plane of the entire system in such a way that the linear magnification in two mutually perpendicular diameters of the image plane is different.

The invention relates particularly to such supplementary lens systems which consist of a part system of positive cylindrical refractive power next to the objective and of a part system of negative cylindrical refractive power separated from the aforesaid by an air space wherein the cylinder axes of these members are parallel to each other. The cylinder axes of the two members of the supplementary lens system lie therein in a vertical plane so that the system reduces the focal length of the taking or of the reproducing objective in the horizontal plane while the focal length in the vertical plane remains unchanged i.e. in the horizontal plane an alteration of the image magnification is effected while in the vertical plane the image magnification remains unchanged.

Lens systems of this kind have been described and claimed in our copending patent specifications No 2,721,500, patented October 25, 1955, and No. 2,731,883, patented January 24, 1956.

In systems of this kind certain image aberrations do occur which have different causes and are of different kind than the aberrations usual in systems of rotational symmetry particularly there occur therein transverse variations of the aberrations of definition in the form of lines of confusion whose major extent lies in the section having the optical effect. It can be shown that the lines of confusion may be represented for the spherical aberration as well as for the asymmetrical aberration and for the tangential aberration of oblique bundles whose principal ray runs in the section having the optical effect, by the same sum formulae as the corresponding aberration contributions of systems of rotational symmetry. (Sum terms of the Seidel theory.) In afocal anamorphotic systems on which the invention is based there occurs amongst others a further occasionally very disturbing image aberration which becomes effective for such extra-axial bundles whose principal ray forms an angle with the section having the optical effect. The figure of confusion corresponding to this image aberration is also a line whose major extension lies in the section having the optical effect.

In the anamorphotic systems which have been known to date and which consist of part systems with cylindrical refractive power it is not possible to keep this image aberration just described below a certain limit if it is simultaneously postulated that the remaining image aberrations shall be fully corrected. An extensive theoretical investigation whose details would exceed the frame of the present description and also the results of trigonometrical computations have shown that this aberration may be eliminated in the following way:

According to the invention in a system which consists of a member with positive cylindrical refractive power and of a member with negative cylindrical refractive power separated from the aforesaid by an air space wherein the air space is greater than ½ the focal length of that member which has the shorter focal length, there is arranged between the two part systems a correcting member whose thickness equals ½ the absolute value of the focal length of the part system having the shorter focal length.

The correcting effect of the correcting member according to the invention consists preponderantly in its great thickness. According to one embodiment of the invention the correcting member is designed as a thick plate with plane or approximately plane external surfaces.

Instead of introducing a separate correcting member of great thickness one obtains a further embodiment of the invention by having at least one of the lenses in the two part systems show a thickness which is at least equal to ½ the absolute value of the focal length of the part system with the sorter focal length.

Figure 2:
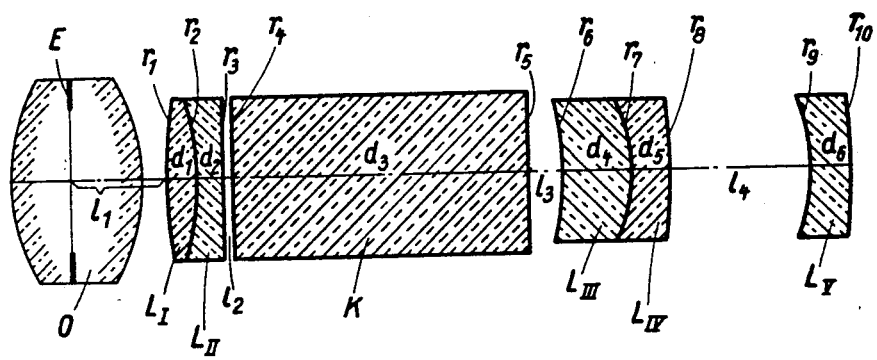
Figure 3:
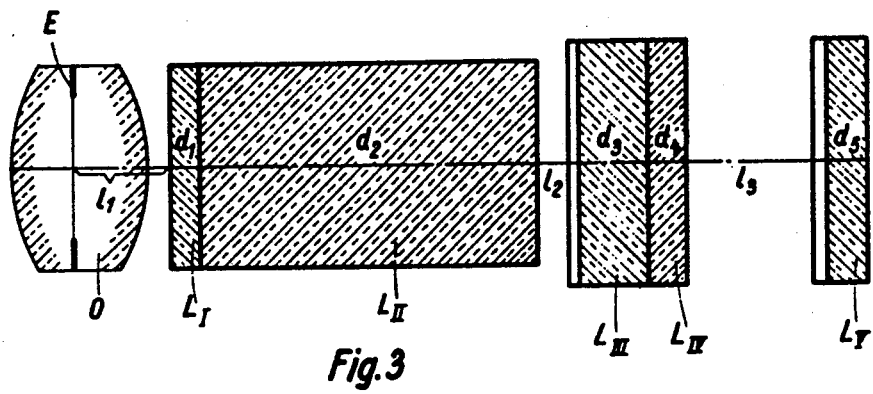
Figure 4:
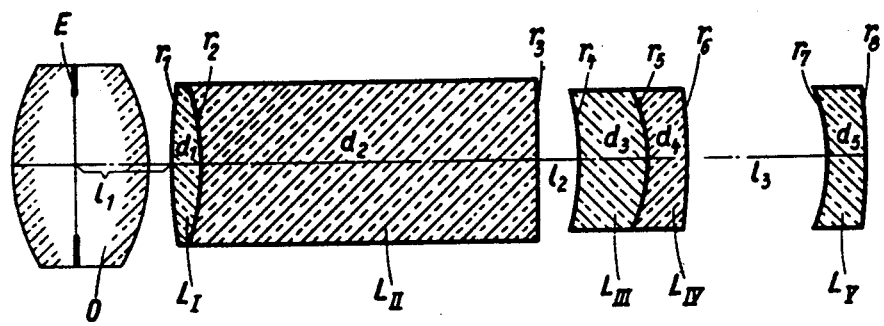

In the accompanying illustrations two embodiments of designs of supplementary lens systems according to the invention with means of eliminating the aforesaid aberrations are represented which are combined to a complete system with a photographic objective of any design, and more particularly there is shown in Figs. 1 and 3 one vertical axial section each and in Figs. 2 and 4 one horizontal axial section each through these complete systems. The numerical values for the supplementary lens systems are given in the following Tables I and II. Herein there are designated:

By L the individual lenses,
By r the radii,
By d the thicknesses,
By l the air spaces,
By K the correcting member positioned between the collective part system and the dispersive part system,
By O the photographic system of any design,
By E the plane of the crossing point of the principal rays which in the case of the use of the entire system as a taking objective represents simultaneously the exit pupil of the supplementary lens system and the entrance pupil of an objective while in the case of the use as projection objective the roles of the entrance and exit pupils are interchanged.

Further there are designated:

By $n_d$ the refractive indices,
By $v_d$ the Abbe numbers of the glasses, and
By $\Delta n/r$ the refractive powers of the individual lens surfaces.

Table I (Figs. 1 and 2)

$f_1$ = the individual focal length of the collective part system ($L_I$; $L_{II}$) = +200.5.
$f_2$ = the individual focal length of the dispersive part system ($L_{III}$; $L_{IV}$; $L_V$) = −103.2.
Anamorphotic expansion in the horizontal section 2.0 times.

|  | Radii | Thicknesses and separations | $n_d$ | $v_d$ | $\Delta n/r$ |
|---|---|---|---|---|---|
| $L_I$ | $r_1 = +139.24$ | $l_1 = 25.0$ | | | +0.00445569 |
|  | $r_2 = -71.821$ | $d_1 = 7.0$ | 1.6204 | 60.3 | +0.00054260 |
| $L_{II}$ |  | $d_2 = 7.0$ | 1.5814 | 40.8 | 0 |
|  | $r_3 = \infty$ | $l_2 = 2.0$ | | | 0 |
|  | $r_4 = \infty$ | $d_3 = 78.0$ | 1.5163 | 64.0 |  |
| K | $r_5 = \infty$ |  | | | 0 |
|  |  | $l_3 = 8.5$ | | | −0.01043263 |
|  | $r_6 = -77.179$ | $d_4 = 18.0$ | 1.8052 | 25.5 | +0.00538264 |
| $L_{III}$ | $r_7 = -41.567$ | $d_5 = 10.0$ | 1.5814 | 40.8 | +0.00361615 |
| $L_{IV}$ | $r_8 = -160.79$ | $l_4 = 36.6$ | | | −0.01202047 |
|  | $r_9 = -51.582$ | $d_6 = 10.0$ | 1.6200 | 36.3 | +0.00364066 |
| $L_V$ | $r_{10} = -170.31$ |  | | | |

Table II (Figs. 3 and 4)

$f_1$ = the individual focal length of the collective part system ($L_I$; $L_{II}$) = +200.5.
$f_2$ = the individual focal length of the dispersive part system ($L_{III}$; $L_{IV}$; $L_V$) = −103.2.
Anamorphotic expansion in the horizontal section 2.0 times.

|  | Radii | Thicknesses and separations | $n_d$ | $v_d$ | $\Delta n/r$ |
|---|---|---|---|---|---|
| $L_I$ | $r_1 = +139.24$ | $l_1 = 25.0$ | | | +0.00445569 |
|  | $r_2 = -71.821$ | $d_1 = 7.0$ | 1.6204 | 60.3 | +0.00054260 |
| $L_{II}$ |  | $d_2 = 88.4$ | 1.5814 | 40.8 | 0 |
|  | $r_3 = \infty$ | $l_2 = 10.5$ | | | |
|  | $r_4 = -77.179$ |  | | | −0.01043263 |
| $L_{III}$ | $r_5 = -41.567$ | $d_3 = 18.0$ | 1.8052 | 25.5 | +0.00538264 |
| $L_{IV}$ | $r_6 = -160.79$ | $d_4 = 10.0$ | 1.5814 | 40.8 | +0.00361615 |
|  | $r_7 = -51.582$ | $l_3 = 36.6$ | | | −0.01202047 |
| $L_V$ | $r_8 = -170.31$ | $d_5 = 10.0$ | 1.6200 | 36.3 | +0.00364066 |

We claim:

1. An afocal anamorphotic supplementary lens system arranged in the imaging path of rays of a photographic objective on the side of the longer distance between the back lens and image, comprising a part system adjacent to the said photographic objective of positive cylindrical power of refraction, another part system separated from the former by an air space of negative cylindrical power of refraction, wherein the cylinder axes of the said two part systems are parallel to each other, and a correcting element located in the said air space between said two part systems and having substantially plane outer surfaces, said correcting element also having a thickness at least equal to half of the absolute value of the individual focal length of that of the two part systems having the shorter focal length, said correcting element substantially eliminating the lines of confusion in the image induced by extra-axial bundles whose principal rays form an angle with respect to a plane perpendicular to the generatrices of the cylindrical part systems.

2. An afocal anamorphotic supplementary lens system arranged in the imaging path of rays of a photographic objective on the side of the longer distance between the back lens and image, comprising a part system adjacent to the said photographic objective of positive cylindrical power of refraction, another part system separated from the former by an air space of negative cylindrical power of refraction, wherein the cylinder axes of the said two part systems are parallel to each other, said part system of negative cylindrical power containing two partial members one of which consists of two lenses of opposite cylindrical power of refraction cemented together, and the other of which being an individual lens element of negative cylindrical power of refraction is separated by air from said cemented partial member, said cemented partial member being located between said partial system of positive cylindrical power of refraction and said individual lens element, and a correcting lens element located in the air space between said cemented part system of positive cylindrical power and the cemented partial member of said part system of negative cylindrical power, said correcting lens element having substantially plane outer surfaces and also having a thickness being at least equal to half of the absolute value of the individual focal length of that of the two part systems having the shorter focal length, said correcting element substantially eliminating the lines of confusion in the image induced by extra-axial bundles whose principal rays form an angle with respect to a plane perpendicular to the generatrices of the cylindrical part systems.

3. An afocal anamorphotic supplementary lens system arranged in the imaging path of rays of a photographic objective on the side of the longer distance between the back lens and image, comprising a part system adjacent to the said photographic objective of positive cylindrical power of refraction, another part system separated from the former by an air space of negative cylindrical power of refraction, wherein the cylinder axes of the said two part systems are parallel to each other, said part system of positive cylindrical power consisting of a lens of positive cylindrical power and cemented thereto of a correcting lens element having a thickness at least equal to half of the absolute value of the individual focal length of that of the two part systems having the shorter focal length, said correcting element substantially eliminating the lines of confusion in the image induced by extra-axial bundles whose principal rays form an angle with respect to a plane perpendicular to the generatrices of the cylindrical part systems.

References Cited in the file of this patent

UNITED STATES PATENTS

| 2,538,209 | Offner | Jan. 16, 1951 |
| 2,721,500 | Kohler et al. | Oct. 25, 1955 |
| 2,731,883 | Kohler et al. | Jan. 24, 1956 |

FOREIGN PATENTS

| 481,561 | Germany | Aug. 24, 1929 |
| 488,547 | Germany | Jan. 8, 1930 |
| 622,046 | Germany | Jan. 3, 1938 |
| 844,683 | Germany | July 24, 1952 |
| 552,355 | France | Jan. 19, 1923 |